United States Patent
Ben Rached et al.

(10) Patent No.: US 10,153,791 B2
(45) Date of Patent: Dec. 11, 2018

(54) METHOD FOR TRANSMITTING RADIO SIGNALS FROM A BASE STATION, A SYSTEM AND A COMPUTER PROGRAM PRODUCT

(71) Applicant: Alcatel Lucent, Boulogne Billancourt (FR)

(72) Inventors: Nidham Ben Rached, Nozay (FR); Patrick Krief, Nozay (FR)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/638,889

(22) Filed: Jun. 30, 2017

(65) Prior Publication Data

US 2018/0006671 A1 Jan. 4, 2018

(30) Foreign Application Priority Data

Jul. 1, 2016 (EP) .................................. 16305833

(51) Int. Cl.
*H04B 1/04* (2006.01)
*H04B 7/06* (2006.01)

(52) U.S. Cl.
CPC ............. *H04B 1/04* (2013.01); *H04B 7/0671* (2013.01); *H04B 7/0682* (2013.01); *H04B 2001/0416* (2013.01)

(58) Field of Classification Search
CPC .................................. H04B 1/04; H04B 7/0682
USPC ........................................................... 455/121
See application file for complete search history.

(56) References Cited

U.S. PATENT DOCUMENTS

| | | | |
|---|---|---|---|
| 9,401,749 B2* | 7/2016 | Krishnamurthy | .... H04B 7/0417 |
| 2010/0267347 A1 | 10/2010 | Melis et al. | |
| 2010/0322349 A1* | 12/2010 | Lee | ....................... H04B 7/0671 375/299 |
| 2013/0115886 A1* | 5/2013 | Khan | ....................... H01Q 3/26 455/42 |

FOREIGN PATENT DOCUMENTS

| | | |
|---|---|---|
| WO | WO 2007/048427 A1 | 5/2007 |
| WO | WO 2007/139325 A1 | 12/2007 |
| WO | WO 2014/169016 A1 | 10/2014 |

OTHER PUBLICATIONS

C. Yuen et al., Four Transmit Diversity Schemes for Coded OFDM Systems with Four Transmit Antennas, Journal of Communications, vol. 3, No. 4, pp. 1-7, Sep. 2008.

* cited by examiner

*Primary Examiner* — Sanh Phu
(74) *Attorney, Agent, or Firm* — Fay Sharpe LLP

(57) ABSTRACT

A method, in a telecommunications system, for transmitting radio signals from a base station comprising at least a pair of transmission branches configured to supply output signals for respective antennae of the base station, to at least one terminal comprising at least one antenna, the method comprising splitting a signal for transmission into at least first and second components, applying a phase shift to the first component to generate a modified first component and providing the modified first component and the second component to respective power amplifiers for transmission over the antennae.

11 Claims, 4 Drawing Sheets

METHOD FOR TRANSMITTING RADIO SIGNALS FROM A BASE STATION, A SYSTEM AND A COMPUTER PROGRAM PRODUCT

TECHNICAL FIELD

Aspects relate, in general, to a method for transmitting radio signals from a base station, a system for the same and a computer program product.

BACKGROUND

A remote radio head (RRH) in a telecommunications system may use multiple-Input Multiple-Output (MIMO) technology in which multiple transmitters and receivers can be used to transfer more data at the same time. MIMO can exploit multipath propagation to enable more than one data signal to be simultaneously sent and received over the same radio channel.

In some instances, a butler matrix may be used to provide signals to antennae for transmission. A typical Butler matrix is made of a variety of quadrature hybrids and fixed phased shifters and is able to form a group of multiple beams fixed in space. Depending on whether transmitting or receiving, a Butler matrix connects each radio frequency (RF) input to the matrix to a unique beam output, or connects each RF output to the matrix to a unique beam input.

Typically, Butler matrices are used in to enable good behaviour in WCDMA systems. This is because, effectively, Butler matrices equalize the power between each transmission antenna port, which is needed for WCDMA to work efficiently. This is, however, not the case for LTE systems in which closed loop transmitted information can be correlated. This can lead to an imbalance in the power distributed between antenna ports, affecting power amplifier life duration.

SUMMARY

According to an example, there is provided a method, in a telecommunications system, for transmitting radio signals from a base station comprising at least a pair of transmission branches configured to supply output signals for respective antennae of the base station, to at least one terminal comprising at least one antenna, the method comprising splitting a signal for transmission into at least first and second components, applying a phase shift to the first component to generate a modified first component, and providing the modified first component and the second component to respective power amplifiers for transmission over the antennae. The method can further comprise dividing the frequency spectrum of the first component to provide first and second continuous frequency signal parts for the first component, applying a phase shift to the first and second signal parts in the frequency domain, and combining the phase shifted first and second signal parts to provide a modified first component. The first component can be phase shifted using a continuous phase shaping function to provide an output signal with a constant envelope. The shaping function can be:

$$S'_1(k)=S_1(k)*\exp(j\pi\varphi(k))$$

where S'1 is the modified first component, S1(k) is the first component, $\varphi(f)=1-\mathrm{Marcum}(f/\sigma)$ and:

$$\mathrm{Marcum}(x) = \frac{1}{\sqrt{2\pi}} \int_x^\infty e^{-\frac{t^2}{2}} dt$$

The modified first component and the second component are uncorrelated components of the signal for transmission.

According to an example, there is provided a system for transmitting radio signals, the system comprising a remote radio head comprising at least a pair of transmission branches configured to supply output signals for respective antennae of a base station, wherein the remote radio head is operable to split a signal for transmission into at least first and second components and apply a phase shift to the first component to generate a modified first component, and provide the modified first component and the second component to respective power amplifiers of the system for transmission over the antennae. The remote radio head can divide the frequency spectrum of the first component to provide first and second continuous frequency signal parts for the first component, apply a phase shift to the first and second signal parts in the frequency domain, and combine the phase shifted first and second signal parts to provide a modified first component. The remote radio head can phase shift using a continuous phase shaping function to provide an output signal with a constant envelope using a shaping function:

$$S'_1(k)=S_1(k)*\exp(j\pi\varphi(k))$$

where S'1 is the modified first component, S1(k) is the first component, $\varphi(f)=1-\mathrm{Marcum}(f/\sigma)$ and:

$$\mathrm{Marcum}(x) = \frac{1}{\sqrt{2\pi}} \int_x^\infty e^{-\frac{t^2}{2}} dt$$

According to an example, there is provided a remote radio head apparatus in a telecommunications system, the remote radio head comprising at least a pair of transmission branches configured to supply output signals for respective antennae of a base station of the system, wherein the remote radio head is operable to split a signal for transmission into at least first and second components and apply a phase shift to the first component to generate a modified first component, and provide the modified first component and the second component to respective power amplifiers of the system for transmission over the antennae.

The remote radio head can divide the frequency spectrum of the first component to provide first and second continuous frequency signal parts for the first component, apply a phase shift to the first and second signal parts in the frequency domain and combine the phase shifted first and second signal parts to provide a modified first component. The remote radio head can phase shift using a continuous phase shaping function to provide an output signal with a constant envelope using a shaping function:

$$S'_1(k)=S_1(k)*\exp(j\pi\varphi(k))$$

where S'1 is the modified first component, S1(k) is the first component, $\varphi(f)=1-\mathrm{Marcum}(f/\sigma)$ and:

$$\mathrm{Marcum}(x) = \frac{1}{\sqrt{2\pi}} \int_x^\infty e^{-\frac{t^2}{2}} dt$$

According to an example, there is provided a base station in a telecommunications system, the base station comprising a remote radio head comprising at least a pair of transmission branches configured to supply output signals for respective antennae of a base station of the system, wherein the remote radio head is operable to split a signal for transmission into at least first and second components and apply a phase shift to the first component to generate a modified first component and provide the modified first component and the second component to respective power amplifiers of the system for transmission over the antennae.

The remote radio head can divide the frequency spectrum of the first component to provide first and second continuous frequency signal parts for the first component, apply a phase shift to the first and second signal parts in the frequency domain and combine the phase shifted first and second signal parts to provide a modified first component. The remote radio head can phase shift using a continuous phase shaping function to provide an output signal with a constant envelope using a shaping function:

$$S'_1(k)=S_1(k)*\exp(j\pi\varphi(k))$$

where S'1 is the modified first component, S1(k) is the first component, $\varphi(f)=1-\text{Marcum}(f/\sigma)$ and:

$$\text{Marcum}(x) = \frac{1}{\sqrt{2\pi}} \int_x^\infty e^{-\frac{t^2}{2}} dt$$

According to an example, there is provided a computer program product, comprising a computer usable medium having computer readable program code embodied therein, said computer readable program code adapted to be executed to implement a method as provided herein.

BRIEF DESCRIPTION OF THE DRAWINGS

Embodiments will now be described, by way of example only, with reference to the accompanying drawings, in which.

DESCRIPTION

Figure 1:
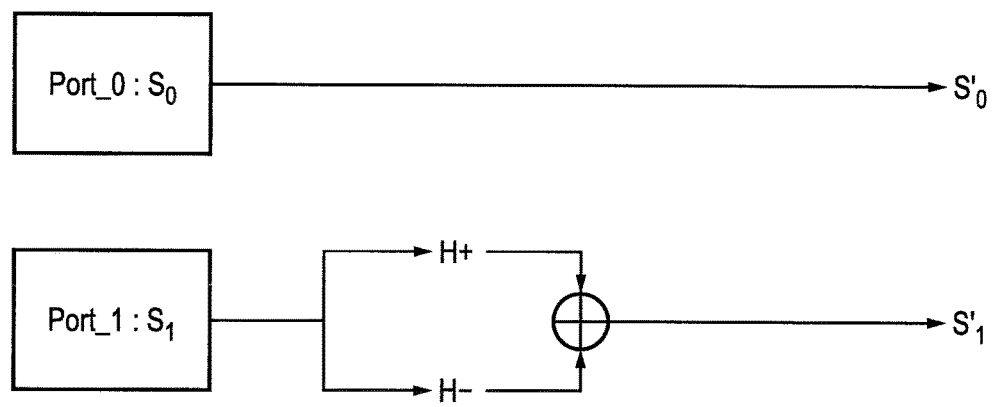
FIG. 1 is a schematic representation of a system according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

According to an example, a method and system is provided for providing uncorrelated (or de-correlated) signals for transmission in a telecommunications system. A method and system according to an example can be used for MBMS or synchronization signals transmission in case of more than one transmission antenna.

A switchable remote radio head (RRH) can use a digital and analog hybrid pair to allow power sharing and reconfiguration across ports. Butler Matrix architectures were developed and deployed for WCDMA across sectors with low correlation across sectors/ports. However, LTE in Closed Loop mode may select codebooks with highly correlated PDSCH across PRB, thus making the input signal to the Butler Matrix Pair correlated. With correlated signals, one of the two matrix legs may be driven to a higher power than the other(s), tripping alarms and overdriving a power amplifier. Other LTE signal considerations must also be taken into account—for example, timing and OTDOA must be on one antenna, and there is an expectation of orthogonal polarization and decorrelation across all antennas.

Significant parts of RRH deployments have a legacy of CDMA including Butler matrices to balance power between transmission antennas. These RRHs are not compatible with the LTE transmission mode, particularly the closed loop transmission mode, where use of precoding matrix indices (PMI) can create significant power imbalance between a pair of transmit antenna and a power override at the power amplifier (PA) side. This can result in throughput performances. Accordingly, it is desirable to be able to provide signal preprocessing that can be used to avoid PA override without losing the advantage of LTE closed loop modes.

According to an example, a method and system can perform smart decorrelation of signals to be fed to the RF chain in a RRH without sacrificing the advantage of closed loop transmission mode. The method and system maintain full correlation in two parts of the frequency spectrum while providing uncorrelated time domain signals to be fed to the RF part.

That is, a method is provided, in a telecommunications system, for transmitting radio signals from a base station comprising at least a pair of transmission branches to at least one terminal comprising at least one antenna. The method comprises splitting a signal for transmission into at least two components, and dividing one of the at least two components to provide first and second continuous frequency signal parts. A phase shift is applied to the first and second signal parts in the frequency domain, and the phase shifted first and second signal parts are combined to provide a modified signal component. The modified signal component and an unmodified signal component are used for transmission over a pair of antennae. That is, the modified and unmodified components can be provided to respective power amplifiers for transmission over at least two antennae of the base station.

Accordingly, in broad terms, the first signal is unchanged and for the second signal, the spectrum is divided in two continuous parts, Band 1 and Band 2. In the frequency domain samples, the signal for Band 1 is modified by applying a phase rotation of 0 degree and the signal for Band 2 is modified by application of a 180° phase change. There is therefore full correlation between the two processed signals in each sub band, thus allowing the closed loop mode gain to be maintained, whilst the two time domain signals fed to PAs are perfectly uncorrelated, thus avoiding any PA override.

In an example, in order to avoid negative user equipment (UE) consequences due to envelope discontinuity on UE receiver channel estimation and also on the out of band TX emissions consequences it is desirable to perform the phase jump from 0 to 180 degrees using a "well behaved" phase filter that allows for a continuous phase increase over a small intermediate bandwidth. The same idea could be generalized with more than two bands.

Therefore, according to an example, two uncorrelated signals can be provided to a Butler matrix/PA whatever transmission mode used, without significant loss in terms of throughput for a single user case.

FIG. 1 is a schematic representation of a system according to an example. A signal for transmission is split into two components S0 and S1 for two input ports Port_0 and Port_1 as a result of closed loop mode pre-coding. The output of Port_0, S'0=S0. The output of Port_1, S'1 is formed by dividing the component S1 into two parts and processing those parts before they are recombined and provided as output S'1. The output signals may be fed to respective antennae.

H+=middle sub band shaping (frequency domain)
H−=edges sub bands shaping (frequency domain)
H−=1−H+

Figure 2:
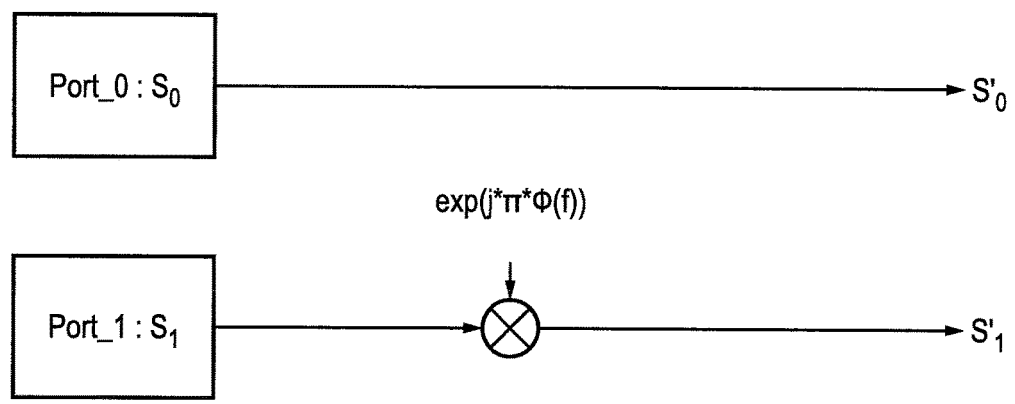
FIG. 2 is a schematic representation of a system according to an example.

Due to symmetry, the Fourier transform of H+ and H− are real in the time domain. In an example, H+ should be smooth to provide accurate channel sounding FIG. 2 is a schematic representation of a system according to an example. As with the system described with reference to FIG. 1, a signal for transmission is split into two components S0 and S1 for two input ports Port_0 and Port_1. The output of Port_0, S'0=S0. The output of Port_1, S'1 is formed by dividing the component S1 into two parts and processing those parts before they are recombined and provided as output S'1.

In the example of FIG. 2:

$$S'_i(k) = S_i(k) * \exp(j\pi\varphi(k))$$

where $\varphi(f) = 1-\text{Marcum}(f/\sigma)$ and $$\text{Marcum}(x) = \frac{1}{\sqrt{2\pi}} \int_x^\infty e^{-\frac{t^2}{2}} dt$$

Accordingly, for a signal which is transmitted over two antennae, only the transmission on the second antenna of a pair is modified by dividing the spectrum in two continuous parts and processing it before recombination or by processing to multiply in the frequency domain using a predefined function or by performing complex filtering in the time domain.

The example described with reference to FIG. 1 is an orthogonal amplitude shaped method that can achieve almost perfect signal de-correlation with no significant degradation in terms of throughput. The example described with reference to FIG. 2 is a continuous phase shaped method with the advantage of providing a constant envelope for the resulting signal.

In FIGS. 1 and 2, S0 and S1 are the result of closed loop mode pre-coding. For example, in the case of a closed loop 1 layer transmission mode on 2 transmitting antennas, S0, S1 is the result of the pre-coding of 1 layer on 2 antennas. It is the signal to transmit in port_0 and port_1. No processing is performed on S0.

In the example described above with reference to FIG. 2, any function varying from +1 at lower frequencies to −1 at higher frequencies can be selected provided that there is 'good' behavior (in terms of smoothness) in order to guarantee accurate channel estimation at the user equipment side and there is a minimum transition bandwidth: transition from +1 to −1.

Note that by symmetry, variations on this function from −1 to +1 with same constraints on bandwidth transition & smoothness can also be selected. In the example described above, a Marcum function is selected because it is based on Gaussian function which is continuous and differentiable at any order. However, it will be appreciated, as noted, that other suitable functions may be used.

Figure 3:
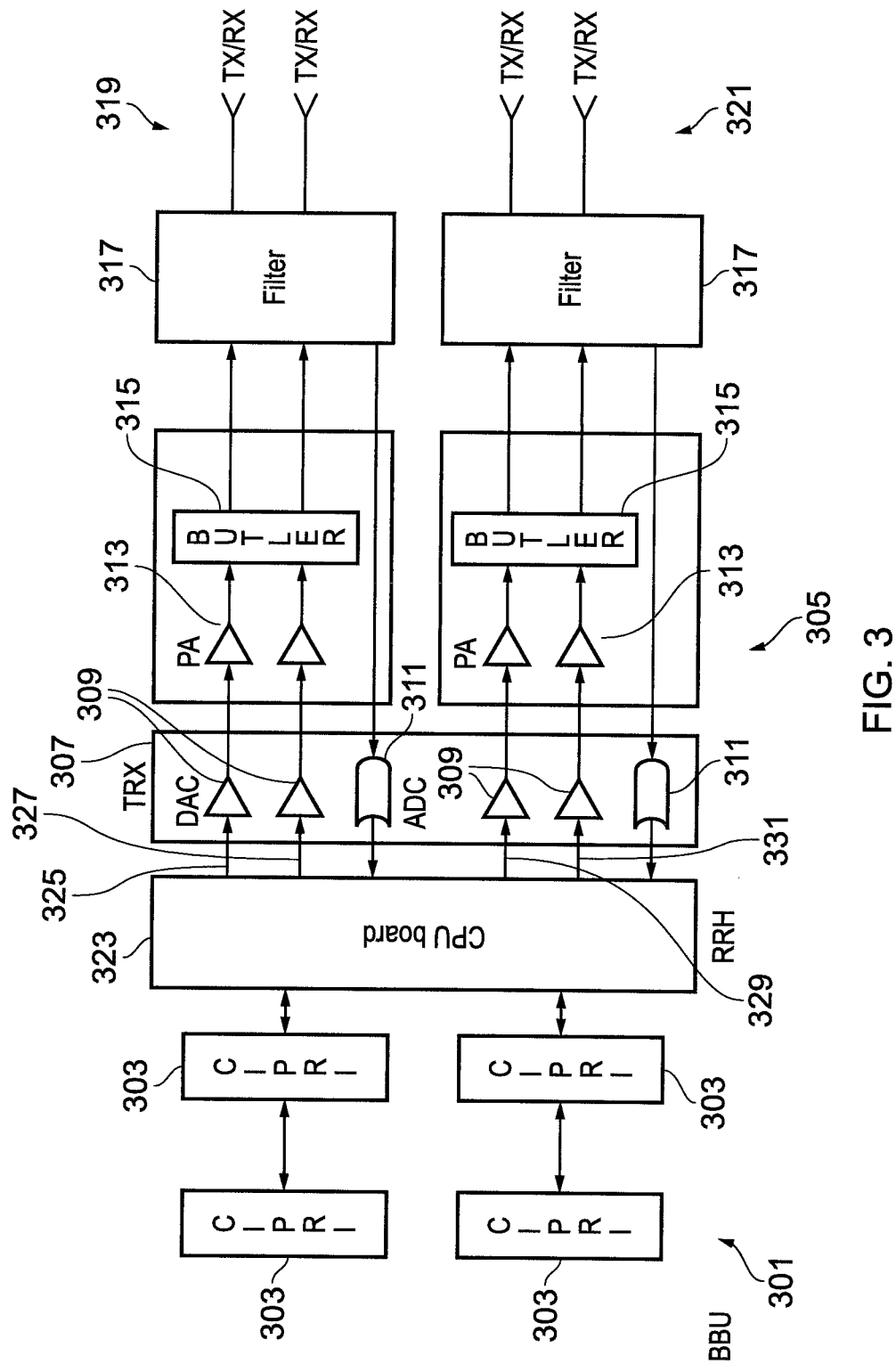
FIG. 3 is a schematic representation of a system according to an example.

FIG. 3 is a schematic representation of a system according to an example. A base band unit (BBH) 301 comprises multiple Common Protocol Radio Interfaces (CIPRI) 303 operable to communicate with CIPRI 303 of a remote radio head (RRH) 305. The RRH 305 comprises a transceiver (TRX) 307 which includes multiple digital to analog (DAC) 309 and analog to digital (ADC) 311 converters. The RRH 305 further comprises power amplifiers (PA) 313, butler matrices 315 and filters 317.

As can be seen from FIG. 3, two sets of antennae 319, 321 are provided, which can transmit and receive signals. According to an example, an input signal is processed either at the BBU 301 or using a CPU board 323 in the RRH 305. That is, a signal to be output using the antennae 319, 321 is processed as described above in order to provide two de-correlated components 325, 327; 329, 331 that can be provided to the power amplifier side of the system without creating a power imbalance, which would otherwise be the case if the signals were correlated.

Figure 4:
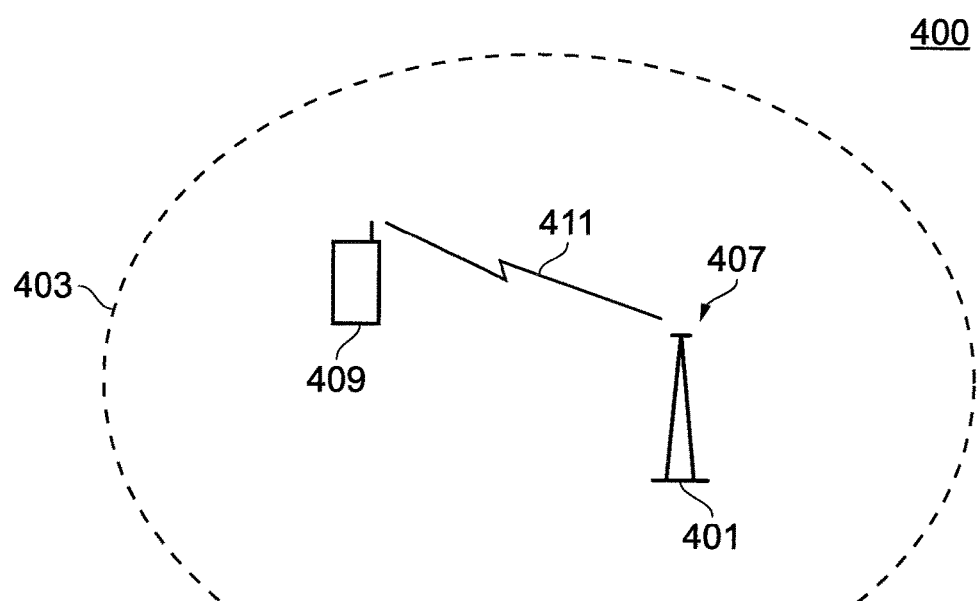
FIG. 4 is a schematic representation of a system according to an example.

FIG. 4 is a schematic representation of a system according to an example. A wireless telecommunications system 400 includes a macro cell base station (node) 401 that serves a given area, known as a cell 403. That is, the radio coverage area of the macro cell base station 401 is the area depicted by 403.

A user equipment (UE) device 409 is in uplink/downlink communications 411 with base station 401. Node 401 includes multiple antennae (not shown) which can transmit/receive signals. Node 401 includes a RRH 407 connected to the main, digital portion of the node 401 via, for example, a fibre optical link.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method, in a telecommunications system, for transmitting radio signals from a base station comprising at least a pair of transmission branches configured to supply output signals for respective antennae of the base station, to at least one terminal comprising at least one antenna, the method comprising:
   splitting a signal for transmission into at least first and second components;
   applying a phase shift to the first component to generate a modified first component;
   providing the modified first component and the second component to respective power amplifiers for transmission over the antennae;
   dividing the frequency spectrum of the first component to provide first and second continuous frequency signal parts for the first component;
   applying a phase shift to the first and second signal parts in the frequency domain; and
   combining the phase shifted first and second signal parts to provide a modified first component.

2. A method as claimed in claim 1, wherein the first component is phase shifted using a continuous phase shaping function to provide an output signal with a constant envelope.

3. A method as claimed in claim 2, wherein the shaping function is:

$$S'_1(k)=S_1(k)*\exp(j\pi\varphi(k))$$

where S'1 is the modified first component, S1(k) is the first component, $\varphi(f)=1-\text{Marcum}(f/\sigma)$ and:

$$\text{Marcum}(x) = \frac{1}{\sqrt{2\pi}} \int_x^\infty e^{-\frac{t^2}{2}} dt$$

4. A method as claimed in claim 1, wherein the modified first component and the second component are uncorrelated components of the signal for transmission.

5. A system for transmitting radio signals, the system comprising:
   a remote radio head comprising at least a pair of transmission branches configured to supply output signals for respective antennae of a base station, wherein the remote radio head is operable to:
   split a signal for transmission into at least first and second components and apply a phase shift to the first component to generate a modified first component;
   provide the modified first component and the second component to respective power amplifiers of the system for transmission over the antennae;
   divide the frequency spectrum of the first component to provide first and second continuous frequency signal parts for the first component;
   apply a phase shift to the first and second signal parts in the frequency domain; and
   combine the phase shifted first and second signal parts to provide a modified first component.

6. A system as claimed in claim 5, wherein the remote radio head is operable to phase shift using a continuous phase shaping function to provide an output signal with a constant envelope using a shaping function:

$$S'_1(k)=S_1(k)*\exp(j\pi\varphi(k))$$

where S'1 is the modified first component, S1(k) is the first component, $\varphi(f)=1-\text{Marcum}(f/\sigma)$ and:

$$\text{Marcum}(x) = \frac{1}{\sqrt{2\pi}} \int_x^\infty e^{-\frac{t^2}{2}} dt$$

7. A remote radio head apparatus in a telecommunications system, the remote radio head apparatus comprising at least a pair of transmission branches configured to supply output signals for respective antennae of a base station of the system, wherein the remote radio head apparatus is operable to:
   split a signal for transmission into at least first and second components and apply a phase shift to the first component to generate a modified first component;
   provide the modified first component and the second component to respective power amplifiers of the system for transmission over the antennae;
   divide the frequency spectrum of the first component to provide first and second continuous frequency signal parts for the first component;
   apply a phase shift to the first and second signal parts in the frequency domain; and
   combine the phase shifted first and second signal parts to provide a modified first component.

8. A remote radio head apparatus as claimed in claim 7, wherein the remote radio head apparatus is operable to phase shift using a continuous phase shaping function to provide an output signal with a constant envelope using a shaping function:

$$S'_1(k)=S_1(k)*\exp(j\pi\varphi(k))$$

where S'1 is the modified first component, S1(k) is the first component, $\varphi(f)=1-\text{Marcum}(f/\sigma)$ and:

$$\text{Marcum}(x) = \frac{1}{\sqrt{2\pi}} \int_x^\infty e^{-\frac{t^2}{2}} dt$$

9. A base station in a telecommunications system, the base station comprising a remote radio head comprising at least a pair of transmission branches configured to supply output signals for respective antennae of the base station of the system, wherein the remote radio head is operable to:
   split a signal for transmission into at least first and second components and apply a phase shift to the first component to generate a modified first component;
   provide the modified first component and the second component to respective power amplifiers of the system for transmission over the antennae;
   divide the frequency spectrum of the first component to provide first and second continuous frequency signal parts for the first component;
   apply a phase shift to the first and second signal parts in the frequency domain; and
   combine the phase shifted first and second signal parts to provide a modified first component.

10. A base station as claimed in claim 9, wherein the remote radio head is operable to phase shift using a continuous phase shaping function to provide an output signal with a constant envelope using a shaping function:

$$S'_1(k)=S_1(k)*\exp(j\pi\varphi(k))$$

where S'1 is the modified first component, S1(k) is the first component, φ(f)=1−Marcum(f/σ) and:

$$\mathrm{Marcum}(x) = \frac{1}{\sqrt{2\pi}} \int_x^\infty e^{-\frac{t^2}{2}} dt$$

11. A computer program product, comprising a non-transitory computer usable medium having computer readable program code embodied therein, said computer readable program code adapted to be executed to implement a method as claimed in claim 1.

* * * * *